United States Patent
Hong et al.

(10) Patent No.: US 12,335,150 B2
(45) Date of Patent: Jun. 17, 2025

(54) TUNNEL MANAGEMENT METHOD, APPARATUS, AND SYSTEM

(71) Applicant: Huawei Technologies Co., Ltd., Shenzhen (CN)

(72) Inventors: Lihong Hong, Dongguan (CN); Jian Ye, Dongguan (CN); Zhiguo Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/328,236

(22) Filed: Jun. 2, 2023

(65) Prior Publication Data

US 2023/0318978 A1 Oct. 5, 2023

Related U.S. Application Data

(63) Continuation of application No. PCT/CN2021/130692, filed on Nov. 15, 2021.

(30) Foreign Application Priority Data

Dec. 4, 2020 (CN) .......................... 202011417110.X

(51) Int. Cl.
H04L 47/125 (2022.01)
H04L 12/46 (2006.01)
H04L 45/00 (2022.01)

(52) U.S. Cl.
CPC ........ *H04L 47/125* (2013.01); *H04L 12/4633* (2013.01); *H04L 45/26* (2013.01)

(58) Field of Classification Search
CPC .... H04L 47/125; H04L 12/4633; H04L 45/22
USPC ......................................................... 709/238
See application file for complete search history.

(56) References Cited

U.S. PATENT DOCUMENTS

| | | | |
|---|---|---|---|
| 2009/0075605 A1* | 3/2009 | Yoshida | H04L 63/0272 455/91 |
| 2012/0271928 A1 | 10/2012 | Kern et al. | |
| 2014/0269266 A1 | 9/2014 | Filsfils et al. | |
| 2015/0109938 A1* | 4/2015 | Zhang | H04L 41/08 370/241.1 |
| 2019/0036813 A1* | 1/2019 | Shenoy | H04L 45/02 |
| 2020/0213223 A1* | 7/2020 | Peng | H04L 41/12 |

(Continued)

FOREIGN PATENT DOCUMENTS

| | | | | |
|---|---|---|---|---|
| CN | 106452925 A | | 2/2017 | |
| CN | 110581774 A | * | 12/2019 | ............... H04L 1/22 |

(Continued)

*Primary Examiner* — Ruolei Zong
(74) *Attorney, Agent, or Firm* — Conley Rose, P.C.

(57) ABSTRACT

A tunnel management method includes sending, by a head node of an end-to-end segment routing traffic engineering (SR-TE) tunnel, an operation, administration, and maintenance (OAM) packet to an intermediate node of the SR-TE tunnel, setting an outer label stack of the OAM packet to enable a stack bottom label to point to the intermediate node, receiving an identifying the OAM packet by an intermediate node, obtaining, by the intermediate node, OAM information related to a tunnel between the head node and the intermediate node of the SR-TE tunnel, and sending, by one or more intermediate nodes of the SR-TE tunnel, OAM information obtained by the intermediate nodes to a control management device.

20 Claims, 11 Drawing Sheets

(56) References Cited

U.S. PATENT DOCUMENTS

2020/0382416 A1\* 12/2020 Hu .......................... H04L 45/50
2021/0044538 A1\* 2/2021 Hu ......................... H04L 45/507
2021/0092055 A1\* 3/2021 Huang .................... H04L 45/50
2021/0119907 A1\* 4/2021 Hu .......................... H04L 45/28

FOREIGN PATENT DOCUMENTS

CN        110661700 A  \*   1/2020  ............. H04L 45/22
CN        110661706 A  \*   1/2020  ............. H04L 45/20

\* cited by examiner

TUNNEL MANAGEMENT METHOD, APPARATUS, AND SYSTEM

CROSS-REFERENCE TO RELATED APPLICATIONS

This application is a continuation application of International Patent Application No. PCT/CN2021/130692, filed on Nov. 15, 2021, which claims priority to Chinese Patent Application 202011417110.X, filed on Dec. 4, 2020. The disclosures of the aforementioned applications are hereby incorporated by reference in their entireties.

TECHNICAL FIELD

This application relates to the communication field, and in particular, to a tunnel management method, apparatus, and system.

BACKGROUND

In a communication network, a segment routing traffic engineering (SR-TE) tunnel may be used to transmit a service, and the service may have a high requirement for quality of the SR-TE tunnel. To ensure normal transmission of the service, operation, administration, and maintenance (OAM) information of the SR-TE tunnel needs to be obtained, and the SR-TE tunnel is managed based on the OAM information.

Currently, OAM information of an end-to-end SR-TE tunnel from a head node to a tail node may be obtained on a tail node of the ST-TE tunnel. Based on the OAM information, only the entire SR-TE tunnel can be managed, and refined management cannot be performed on the tunnel, resulting in low operation and maintenance efficiency.

SUMMARY

This application provides a tunnel management method, apparatus, and system, to perform refined management on an SR-TE tunnel, implement efficient fault locating and troubleshooting, and improve operation and maintenance efficiency. The technical solutions are as follows:

According to a first aspect, this application provides a tunnel management method. In the method, a first node obtains an OAM packet sent by a head node. The first node is an intermediate node between a head node and a tail node of a first SR-TE tunnel. The first node obtains OAM information of a second SR-TE tunnel based on the OAM packet. The second SR-TE tunnel is a tunnel between the head node and the first node, and is a part of the first SR-TE tunnel.

According to the foregoing solution, as the intermediate node of the first SR-TE tunnel, the first node can obtain and identify the OAM packet sent by the head node, and the first node obtains the OAM information of the second SR-TE tunnel based on the OAM packet. In this way, refined management on the first SR-TE tunnel can be implemented based on the OAM information. For example, the intermediate node may collect statistics on performance of the second SR-TE tunnel based on the obtained OAM information, and notify a control management device of a corresponding statistical result. Alternatively, the intermediate node may directly report the OAM information to the control management device. The control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

Optionally, the first node sends the OAM information to the control management device. Because the first node is the intermediate node of the first SR-TE tunnel, the control management device can receive OAM information sent by the intermediate node of the first SR-TE tunnel, and determine OAM information of any tunnel segment of the first SR-TE tunnel based on the OAM information of the intermediate node of the first SR-TE tunnel. When a fault occurs on the first SR-TE tunnel, specific fault locating is performed based on OAM information of any tunnel segment of the first SR-TE tunnel, to perform refined management on the first SR-TE tunnel, and improve operation and maintenance efficiency. The control management device may further plan a forwarding path corresponding to the first SR-TE tunnel, and avoid a congested or faulty node and tunnel when planning the forwarding path. The planned forwarding path may avoid congestion and reduce a delay, and the forwarding path is used to transmit a service, to improve service transmission efficiency.

Optionally, the OAM packet includes first information, the first information includes first indication information, and the first indication information indicates the first SR-TE tunnel. In this way, the first node can associate the obtained OAM information with the first SR-TE tunnel based on the first indication information.

Optionally, the first information further includes a head node identifier of the first SR-TE tunnel. The OAM information may be more accurately associated with the first SR-TE tunnel through the head node identifier and with reference to the first indication information.

Optionally, the first node creates, based on the first information, an OAM maintenance entity group corresponding to the second SR-TE tunnel. In the OAM maintenance entity group, an identifier of a local maintenance entity end point is a maintenance entity group end point identifier of the first node, and an identifier of a remote maintenance entity end point is a maintenance entity group end point identifier of the head node. In this way, the OAM information of the second SR-TE tunnel may be associated through the OAM maintenance entity group.

Optionally, the first indication information includes a maintenance entity group end point identifier (MEP ID) and a maintenance entity group identifier MEG ID corresponding to an OAM maintenance entity group of the first SR-TE tunnel; or the first indication information includes a tunnel identifier of the first SR-TE tunnel.

Optionally, the first node receives a first packet, and the first packet includes a stack bottom label and the OAM packet. The first node pops up the stack bottom label and obtains the OAM packet. Because the first node pops up the stack bottom label, an OAM packet that can be identified by the first node is exposed, and the first node may obtain the OAM information of the second SR-TE tunnel based on the OAM packet.

According to a second aspect, this application provides a tunnel management method. In the method, a first node of a first segment routing traffic engineering SR-TE tunnel obtains a first packet. The first packet includes a label stack and an operation, administration, and maintenance OAM packet, a stack bottom label of the label stack points to a second node of the first SR-TE tunnel, and the second node is a first intermediate node between a head node and a tail node of the first SR-TE tunnel. The first node sends the first packet to the second node.

According to the foregoing solution, because the stack bottom label of the label stack of the first packet obtained by the first node points to the second node of the first SR-TE tunnel, when the first packet is transmitted to the second node, the second node can obtain and identify the OAM packet included in the first packet. As an intermediate node of the first SR-TE tunnel, the second node obtains OAM information of a second SR-TE tunnel based on the OAM packet. The second SR-TE tunnel is a tunnel between the head node and the second node, and is a part of the first SR-TE tunnel. In this way, refined management on the first SR-TE tunnel can be implemented based on the OAM information. For example, the second node may collect statistics on performance of the second SR-TE tunnel based on the obtained OAM information, and notify a control management device of a corresponding statistical result. Alternatively, the second node may directly report the OAM information to the control management device. The control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

Optionally, the OAM packet includes first indication information, and the first indication information indicates the first SR-TE tunnel. In this way, the second node can associate the obtained OAM information with the first SR-TE tunnel based on the first indication information.

Optionally, the OAM packet further includes an identifier of the head node. The second node may more accurately associate the OAM information with the first SR-TE tunnel through the head node identifier and with reference to the first indication information.

Optionally, the OAM packet includes an extended type-length-value (TLV), and the extended TLV includes the first indication information and/or the identifier of the head node.

Optionally, the first indication information includes a maintenance entity group end point identifier MEP ID and a maintenance entity group identifier (MEG ID) corresponding to an OAM maintenance entity group of the first SR-TE tunnel; or the first indication information includes a tunnel identifier of the first SR-TE tunnel.

Optionally, the first node is a second intermediate node between the head node and the tail node of the first SR-TE tunnel.

Optionally, the first node is the head node of the first SR-TE tunnel.

Optionally, the OAM packet is a delay detection packet or a packet loss detection packet. In response to determining that the second SR-TE tunnel between the first node and the second node is normally connected, the first packet is sent to the second node, and the second SR-TE tunnel is a part of the first SR-TE tunnel. In this way, the second node can obtain a transmission delay or a packet loss rate of the second SR-TE tunnel through the delay detection packet or the packet loss detection packet.

Optionally, the first node receives second indication information, and the second indication information indicates that the second SR-TE tunnel is normally connected. The transmission delay or the packet loss rate of the second SR-TE tunnel needs to be detected only when the second SR-TE tunnel is normally connected. Because the second indication information indicates that the second SR-TE tunnel is normally connected, it is ensured that the first node obtains a first packet including the delay detection packet or the packet loss detection packet only when determining, based on the second indication information, that the second SR-TE tunnel is normally connected.

Optionally, the first node receives the second indication information sent by the control management device, or the first node receives the second indication information sent by the second node. It is determined that, based on the second indication information, that the second SR-TE tunnel is normally connected.

According to a third aspect, this application provides a tunnel management method. In the method, a control management device receives first operation, administration, and maintenance OAM information that is sent by a first node of a first segment routing traffic engineering SR-TE tunnel and that corresponds to a second SR-TE tunnel. The first node is a first intermediate node of the first SR-TE tunnel, the second SR-TE tunnel is a tunnel between a head node of the first SR-TE tunnel and the first node, and the second SR-TE tunnel is a part of the first SR-TE tunnel. The control management device manages the first SR-TE tunnel based on the first OAM information.

According to the foregoing solution, as an intermediate node of the first SR-TE tunnel, the first node may directly send the first OAM information to the control management device. The control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

Optionally, the control management device receives second OAM information that is sent by a second node and that corresponds to a third SR-TE tunnel. The second node is a second intermediate node of the first SR-TE tunnel, the third SR-TE tunnel is a tunnel between the head node of the first SR-TE tunnel and the second node, and the third SR-TE tunnel is a part of the first SR-TE tunnel. The control management device obtains third OAM information of a fourth SR-TE tunnel between the first node and the second node based on the first OAM information and the second OAM information. The fourth SR-TE tunnel is a part of the first SR-TE tunnel. In this way, the control management device may obtain OAM information of each tunnel segment of the first SR-TE tunnel, to locate, based on the OAM information of each tunnel segment, a faulty node or tunnel segment, or locate a congested node or tunnel segment, to improve precision of fault locating or congestion locating. In addition, the located node or tunnel may be avoided during recalculation of the forwarding path, and effective guidance is provided during recalculation of the forwarding path.

Optionally, the first node and the second node are two different nodes of the first SR-TE tunnel.

Optionally, the control management device sends an alarm when a packet loss rate or a transmission delay included in the third OAM information exceeds a threshold. In this way, a network administrator may trace a tunnel status in real time based on an alarm indication to accordingly manage the tunnel.

Optionally, the control management device recalculates a forwarding path of the first SR-TE tunnel based on the first OAM information. A faulty or congested node or tunnel segment may be determined based on the first OAM information. In this way, a recalculated forwarding path may avoid the node or the tunnel segment.

Optionally, the control management device sends second indication information to the head node. The second indication information indicates that the second SR-TE tunnel is normally connected. In this way, the head node may be notified, through the second indication information, whether the second SR-TE tunnel is normally connected.

Optionally, the control management device periodically generates a first packet and sends the first packet to the head node.

According to a fourth aspect, this application provides a tunnel management apparatus. The apparatus includes a transceiver unit and a processing unit. The transceiver unit is configured to perform a receiving and sending operation performed by a first node when the tunnel management method according to the first aspect or any optional manners of the first aspect is implemented. The processing unit is configured to perform another operation other than receiving and sending. For example, when the tunnel management method according to the first aspect is implemented, the transceiver unit is configured to receive an OAM packet sent by a head node, and the processing unit is configured to obtain OAM information of a second SR-TE tunnel based on the OAM packet.

According to a fifth aspect, this application provides a tunnel management apparatus. The apparatus includes a transceiver unit and a processing unit. The transceiver unit is configured to perform a receiving and sending operation performed by a first node when the tunnel management method according to the second aspect or any optional manners of the second aspect is implemented. The processing unit is configured to perform another operation other than receiving and sending. For example, when the tunnel management method according to the second aspect is implemented, the processing unit is configured to obtain a first packet, and the transceiver unit is configured to send the first packet to a second node.

According to a sixth aspect, this application provides a tunnel management apparatus. The apparatus includes a transceiver unit and a processing unit. The transceiver unit is configured to perform a receiving and sending operation performed by a control management device when the tunnel management method according to the third aspect or any optional manners of the third aspect is implemented. The processing unit is configured to perform another operation other than receiving and sending. For example, when the tunnel management method according to the third aspect is implemented, the transceiver unit is configured to receive a first operation, administration, and maintenance OAM information that is sent by a first node of a first segment routing traffic engineering SR-TE tunnel and that corresponds to a second SR-TE tunnel, and the processing unit is configured to manage the first SR-TE tunnel based on the first OAM information.

According to a seventh aspect, this application provides a first node. The first node includes a processor, a memory, and a computer program stored in the memory. When the processor executes the computer program, the first node is enabled to implement the method according to the first aspect or any optional manners of the first aspect.

According to an eighth aspect, this application provides a first node. The first node is a head node of a first segment routing traffic engineering SR-TE tunnel, and includes a memory, a processor, and a computer program or instructions stored in the memory. When the processor executes the computer program or the instructions, the first node is enabled to implement the method according to the second aspect or any optional manners of the second aspect.

According to a ninth aspect, this application provides a control management device. The control management device includes a memory, a processor, and a computer program or instructions stored in the memory. When the processor executes the computer program or the instructions, the control management device is enabled to implement the method according to the third aspect or any optional manners of the third aspect.

According to a tenth aspect, this application provides a computer program product. The computer program product stores a computer program, and when the computer program is executed by a processor, the method according to the first aspect, the second aspect, the third aspect, any optional manners of the first aspect, any optional manners of the second aspect, or any optional manners of the third aspect is implemented.

According to an eleventh aspect, this application provides a computer-readable storage medium. The computer-readable storage medium is configured to store a computer program. When the computer program is executed by a processor, the method according to the first aspect, the second aspect, the third aspect, any optional manners of the first aspect, any optional manners of the second aspect, or any optional manners of the third aspect is implemented.

According to a twelfth aspect, this application provides a communication system for managing an SR-TE tunnel. The system includes a control management device, a head node of the SR-TE tunnel, an intermediate node of the SR-TE tunnel, and a tail node of the SR-TE tunnel. The head node includes the apparatus according to the fifth aspect or the node according to the eighth aspect, the intermediate node includes the apparatus according to the fourth aspect and the node according to the seventh aspect, and the control management device includes the apparatus according to the sixth aspect and the device according to the ninth aspect.

DESCRIPTION OF EMBODIMENTS

The following further describes in detail implementations of this application with reference to accompanying drawings.

Figure 1:
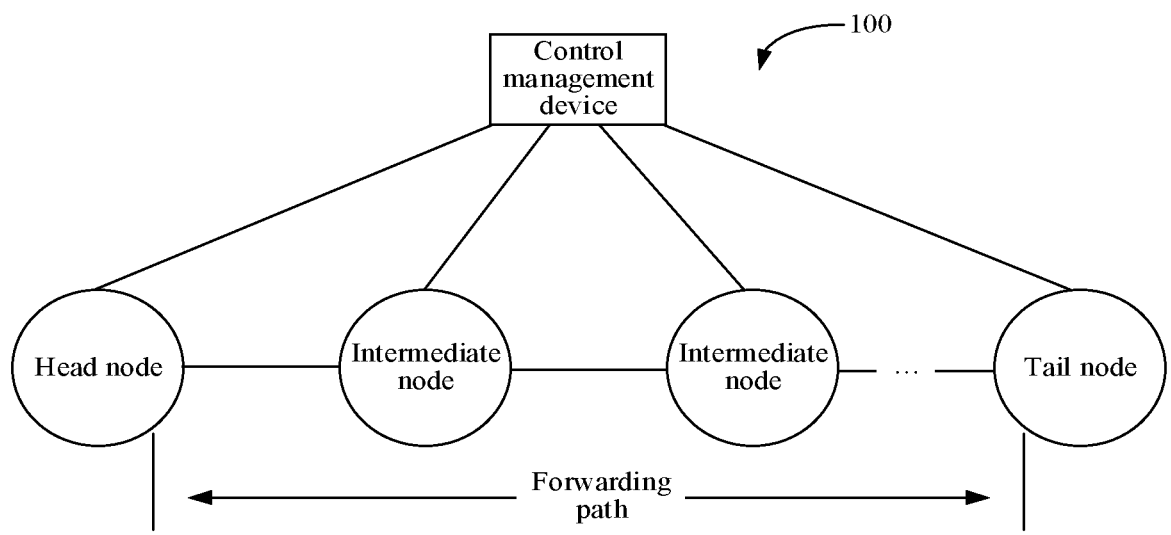
FIG. 1 is a schematic diagram of a network architecture according to an embodiment of this application.

Referring to FIG. 1, an embodiment of this application provides a network architecture 100. The network architecture 100 includes a control management device and a plurality of nodes of an SR-TE tunnel, where the plurality of nodes may communicate with the control management device.

The plurality of nodes includes a head node and a tail node of the SR-TE tunnel, and a plurality of intermediate nodes located between the head node and the tail node. It should be noted that, the SR-TE tunnel may include only one intermediate node. FIG. 1 is merely an example for describing an application scenario of this application, but should not be construed as a limitation on a usage scenario of this application.

In an implementation, one or more nodes in the plurality of nodes may separately directly establish a network connection to the control management device, or one or more nodes in the plurality of nodes may communicate with the control management device through a level-2 controller. Certainly, there are other manners for implementing communication between the node and the control management device, and the manners are not listed one by one herein.

A forwarding path of the SR-TE tunnel is a path between the head node and the tail node of the SR-TE tunnel.

In an implementation, a forwarding plane of the SR-TE tunnel may perform forwarding based on multi-protocol label switching (MPLS) or based on segment routing Internet Protocol version 6 (SRv6).

An OAM maintenance entity group is arranged on the head node of the SR-TE tunnel, to implement OAM detection on the SR-TE tunnel. In configuration information of the OAM maintenance entity group, an identifier of a local maintenance entity end point is a maintenance entity group end point identifier of the head node, and an identifier of a remote maintenance entity end point is a maintenance entity group end point identifier of the tail node of the SR-TE tunnel.

The following uses an example in which the forwarding plane of the SR-TE tunnel performs forwarding based on the MPLS to describe a process of performing OAM detection on an end-to-end SR-TE tunnel from the head node to the tail node. The process may be as follows: The head node generates an OAM detection packet, and the OAM detection packet includes an OAM packet and a label stack encapsulated outside the OAM packet. The label stack includes each path label corresponding to the forwarding path of the SR-TE tunnel and a tunnel label corresponding to the SR-TE tunnel. The tunnel label is a stack bottom label of the label stack, and is used to identify the SR-TE tunnel. Each forwarding node on the forwarding path forwards the OAM detection packet based on an MPLS forwarding procedure and the label stack, and obtains the OAM packet until a tail node of a tunnel pops up a stack bottom label.

The tail node obtains, based on the OAM packet, OAM information corresponding to the SR-TE tunnel. The tail node may send the OAM information of the SR-TE tunnel to the control management device. The control management device manages the SR-TE tunnel based on the OAM information.

Figure 2:
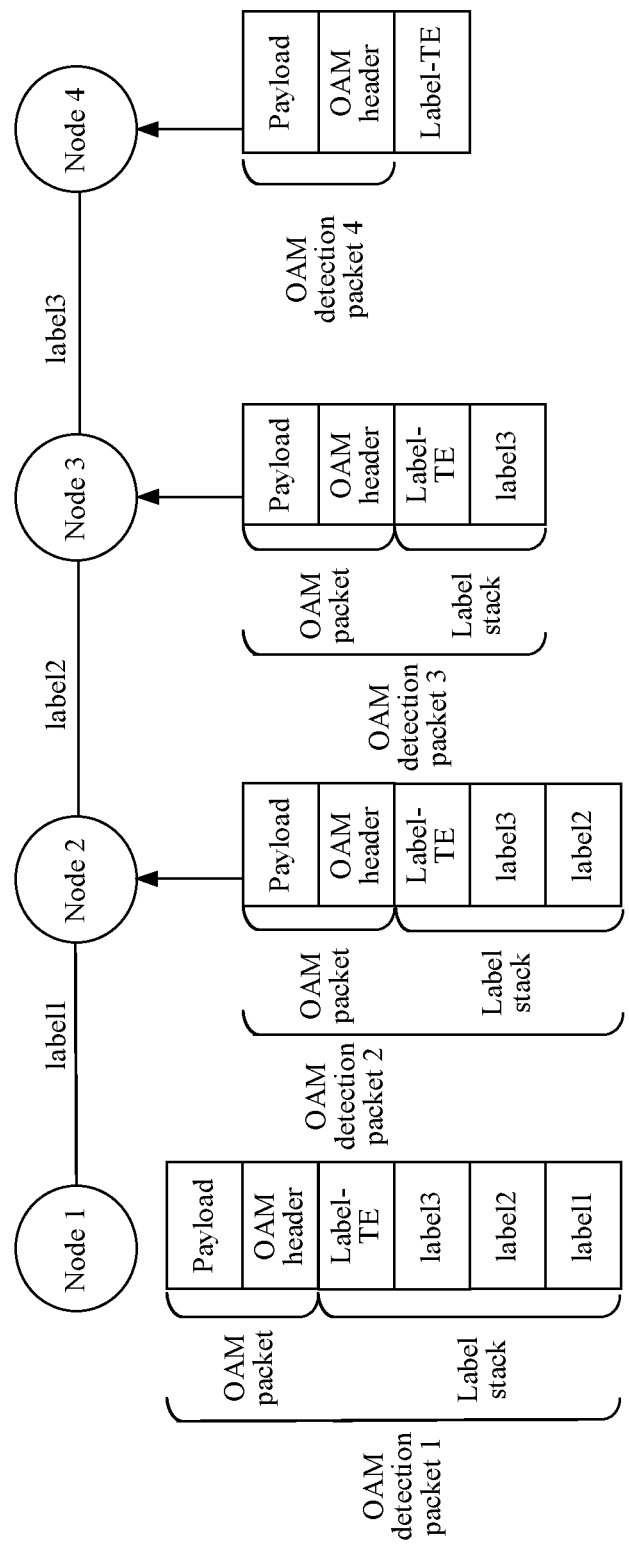
FIG. 2 is a schematic diagram of packet transmission on an SR-TE tunnel according to an embodiment of this application.

For example, referring to FIG. 2, node 1, node 2, node 3, and node 4 are nodes of an SR-TE tunnel. The node 1 (a head node) generates an OAM detection packet 1, and the OAM detection packet 1 includes a label stack and an OAM packet. The label stack includes labels label1, label2, and label3 corresponding to each segment of the SR-TE tunnel, and a tunnel label label-TE corresponding to the SR-TE tunnel. The tunnel label label-TE is used to identify an end-to-end SR-TE tunnel. The node 1 sends the OAM detection packet 1, the node 2 or a previous hop of the node 2 pops up a stack top label, and the node 2 forwards an OAM detection packet 2 to the node 3. A stack top label of the OAM detection packet 2 is label2. The node 3 sends an obtained OAM detection packet 3 to the node 4. The node 4 (a tail node) or a previous hop of the node 4 pops up a stack top label, to obtain an OAM detection packet 4, and the OAM detection packet 4 includes a stack bottom label label-TE and the OAM packet. The node 4 obtains OAM information of the SR-TE tunnel based on the OAM packet 4. The node 4 may send the obtained OAM information to a control management device.

In an implementation, the SR-TE tunnel may be a one-way tunnel or a two-way tunnel. When the SR-TE tunnel is the two-way tunnel, the head node may also obtain the OAM information of the SR-TE tunnel, and send the OAM information of the SR-TE tunnel to the control management device. A process of obtaining the OAM information by the head node is a reverse process of obtaining the OAM information by the tail node, and this is not described in detail herein again.

The head node may periodically generate the OAM detection packet, so that the control management device may periodically obtain the OAM information of the SR-TE tunnel.

In the technical solution described above, the control management device manages an entire SR-TE tunnel based on the obtained OAM information, but cannot manage any tunnel segment in the SR-TE tunnel, and a management granularity is coarse, result in failure of implementing effective fault locating and troubleshooting. In an example, to perform refined management on the SR-TE tunnel, this application provides a method for performing OAM detection on a tunnel and a tunnel management method. According to the method provided in this application, performance of any tunnel segment included in an end-to-end SR-TE may be detected, and refined management can be performed on the tunnel based on a detection result.

In an implementation, a node of the SR-TE tunnel includes a device such as a router, a switch, or a gateway, and the control management device may be a software module, or may be a hardware entity that implements a related function, or a combination of a software module and a hardware entity. For example, the control management device is a device such as a network management device, a controller, or a server that implements a related function.

Figure 3:
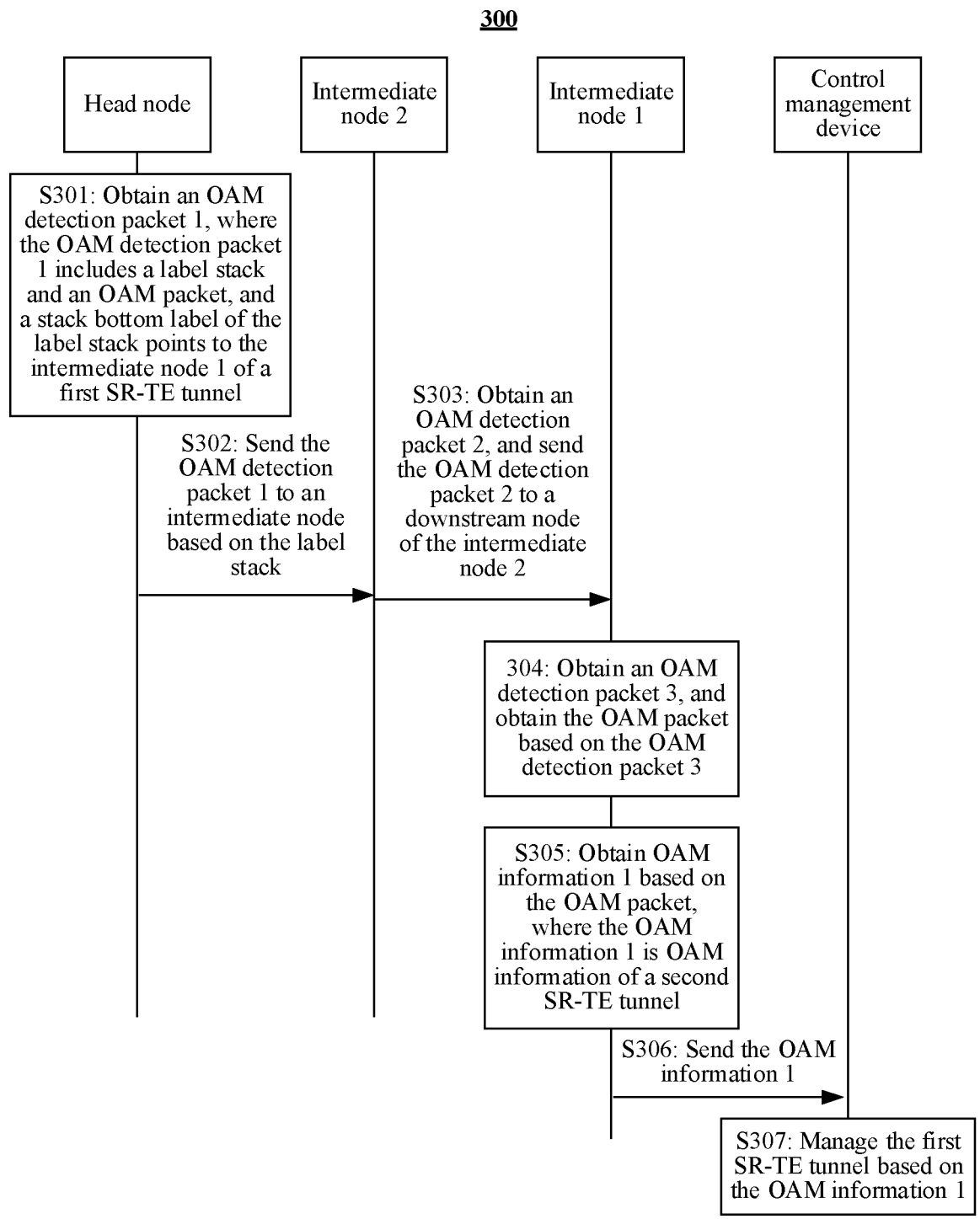
FIG. 3 is a flowchart of a tunnel management method according to an embodiment of this application.

With reference to FIG. 3, the following describes a method for performing OAM detection on a tunnel according to this application.

Referring to FIG. 3, an embodiment of this application provides a method 300 for performing OAM detection on a tunnel. The method 300 may be applied to the network architecture 100 shown in FIG. 1, and the method 300 includes the following steps.

S301: A head node of a first SR-TE tunnel obtains an OAM detection packet 1, where the OAM detection packet 1 includes a label stack and an OAM packet, and a stack bottom label of the label stack points to an intermediate node 1 of the first SR-TE tunnel.

S302: The head node sends the OAM detection packet 1 to an intermediate node based on the label stack.

Along a forwarding path of a packet, the first SR-TE tunnel includes the head node, the intermediate node 1, and a tail node. The label stack is a label stack corresponding to a forwarding path of a second SR-TE tunnel. The second SR-TE tunnel is a tunnel between the head node and the intermediate node 1, and is a part of the first SR-TE tunnel. Based on setting of the label stack of the OAM detection packet 1, the intermediate node 1 can receive and identify the OAM packet, and obtain, based on the OAM packet, OAM information corresponding to the second SR-TE tunnel. The OAM information may include, for example, one or more of indication information for indicating whether the second SR-TE tunnel is normally connected, a transmission delay of the second SR-TE tunnel, jitter, a packet loss rate of the second SR-TE tunnel, and the like. A "normally connected" tunnel (for example, an SR-TE tunnel) is when there is no connectivity fault occurring in the tunnel.

In this embodiment of this application, the head node may periodically send the OAM detection packet 1, to perform OAM detection on the second SR-TE tunnel.

Figure 4:
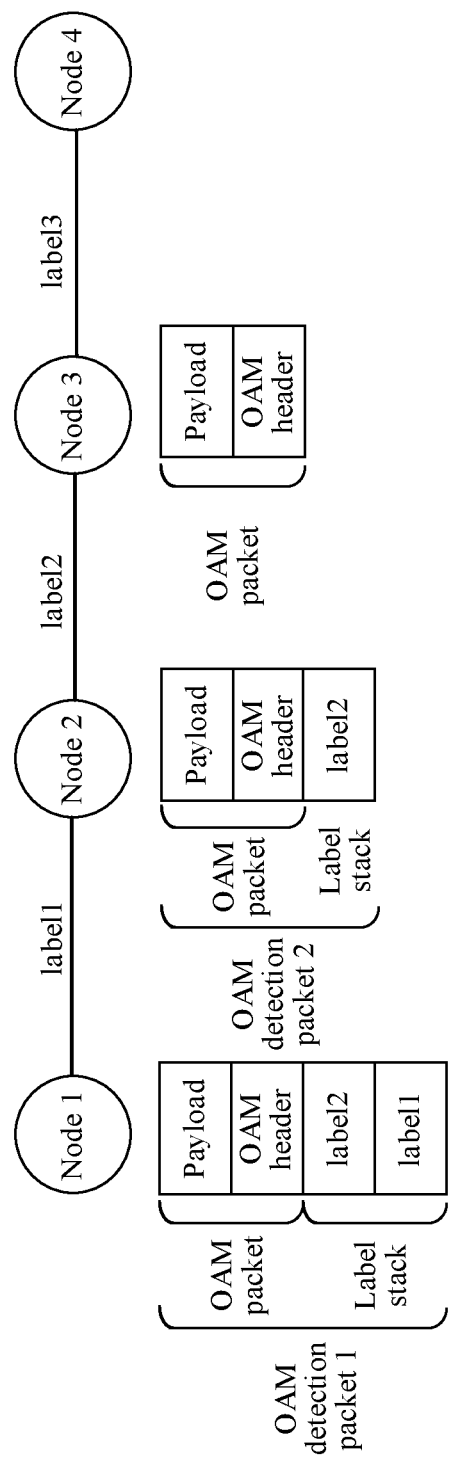
FIG. 4 is a schematic diagram of packet transmission on a second SR-TE tunnel according to an embodiment of this application.

In an implementation, the OAM detection packet 1 is an MPLS packet, and a label in the label stack may include an adjacency label and/or a node label. For example, refer to FIG. 4. Nodes of a first SR-TE tunnel include a node 1, a node 2, a node 3, and a node 4. The node 1 and the node 4 are respectively a head node and a tail node of the first SR-TE tunnel, and the node 2 and the node 3 are intermediate nodes of the first SR-TE tunnel. The node 3 serves as the foregoing intermediate node 1, and a second SR-TE tunnel is a tunnel between the node 1 and the node 3. In an implementation, both label1 and label2 are adjacency labels, and label2 is a stack bottom label pointing to the node 3. In a possible implementation, both label1 and label2 are node labels, or one label is a node label, and the other label is an adjacency label. This is not limited in this application.

Figure 5:
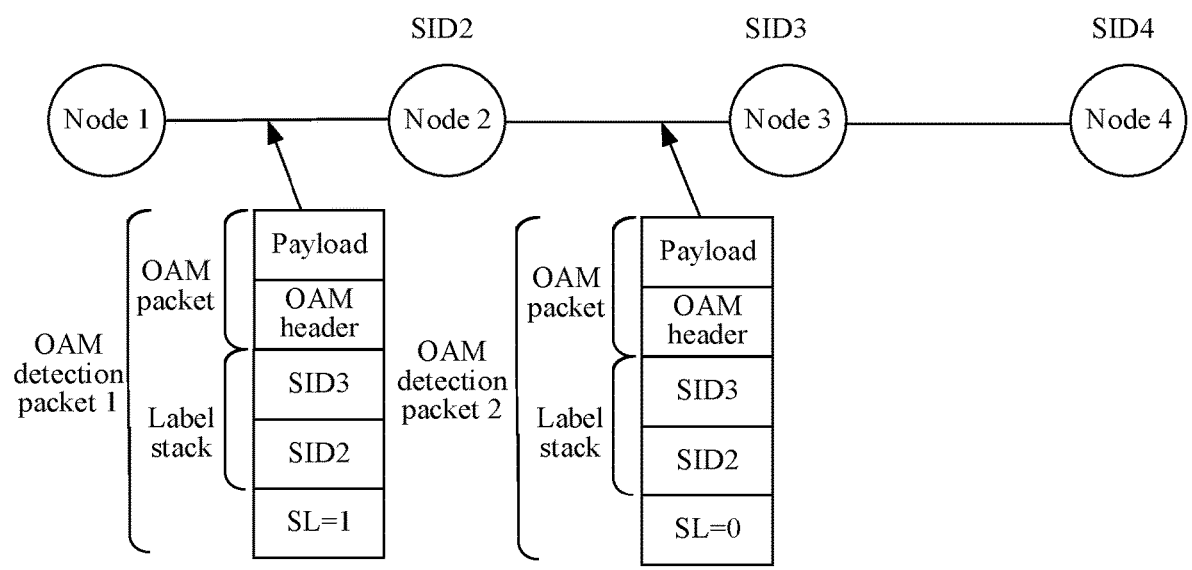
FIG. 5 is another schematic diagram of packet transmission on a second SR-TE tunnel according to an embodiment of this application.

In an implementation, the OAM detection packet 1 is an SRv6 packet. The label stack in this application is a segment list encapsulated in a segment routing header (SRH), and each label in the label stack is a segment identifier (SID) in the segment list. For example, refer to FIG. 5. A label corresponding to a node 2 of a first SR-TE tunnel is a SID2, a label corresponding to a node 3 is a SID3, and a label corresponding to a node 4 is a SID4. The SID2 may be a segment identifier corresponding to the node 2, and includes an Internet Protocol version 6 (IPv6) address of the node 2. The SID3 is a segment identifier corresponding to the node 3, and includes an IPv6 address of the node 3. The node 3 serves as the foregoing intermediate node 1, a second SR-TE tunnel is a tunnel between the node 1 and the node 3, and a label stack of the second SR-TE tunnel includes the SID2 and the SID3. In this case, the SID3 is a stack bottom label pointing to the node 3.

In S301, the head node may obtain the OAM detection packet 1 in, but not limited to, the following two manners.

Manner 1: The head node generates the OAM detection packet 1.

Manner 2: The head node forwards the OAM detection packet 1 sent by the control management device.

In Manner 1, the head node may generate the OAM detection packet 1 by performing the following operations.

When OAM detection needs to be performed on a tunnel between the head node and the intermediate node 1, the head node determines a label stack of a to-be-sent OAM detection packet 1, and a stack bottom label of the label stack points to the intermediate node 1.

In an implementation, the head node randomly selects a node as the intermediate node 1, or selects a node as the intermediate node 1 in a polling manner.

The polling manner refers to a manner in which each intermediate node is sequentially selected starting from a first intermediate node of the first SR-TE tunnel. After a last intermediate node of the first SR-TE tunnel is selected, the first intermediate node is selected again.

In Manner 2, the control management device generates the OAM detection packet 1, and sends the OAM detection packet 1 to the head node. In an implementation, the control management device stores labels corresponding to a plurality of nodes of the first SR-TE tunnel.

In an implementation, the control management device periodically generates and sends the OAM detection packet 1 to the head node, to perform periodic OAM detection on the tunnel between the head node and the intermediate node 1.

In an implementation, the OAM packet in the OAM detection packet 1 includes information 1, the information 1 includes indication information 1, and the indication information 1 indicates the first SR-TE tunnel.

In an implementation, the information 1 further includes a head node identifier of a first SR-TE tunnel, and the head node identifier is used to uniquely identify the head node of the first SR-TE tunnel.

The indication information 1 includes a MEP ID and a MEG ID corresponding to the head node of the first SR-TE tunnel; or the indication information 1 includes a tunnel identifier of the first SR-TE tunnel.

The MEP ID is used to identify the head node in an OAM maintenance entity group corresponding to the MEG ID.

The OAM packet includes an OAM header and a payload, and the payload includes the information 1.

In an implementation, the payload includes an extended TLV, and the extended TLV includes the information 1.

In an implementation, the head node identifier of the first SR-TE tunnel is a label switching router identifier (LSR ID) or the like, and the tunnel identifier of the first SR-TE tunnel is a label switched path identifier (LSP ID) or the like.

The OAM packet includes a CCM, a delay detection packet, a packet loss detection packet, or the like. The CCM is used to detect whether the second SR-TE tunnel is normally connected. The delay detection packet is used to obtain a transmission delay of the second SR-TE tunnel. The packet loss detection packet is used to obtain a packet loss rate of the second SR-TE tunnel.

Figure 6:
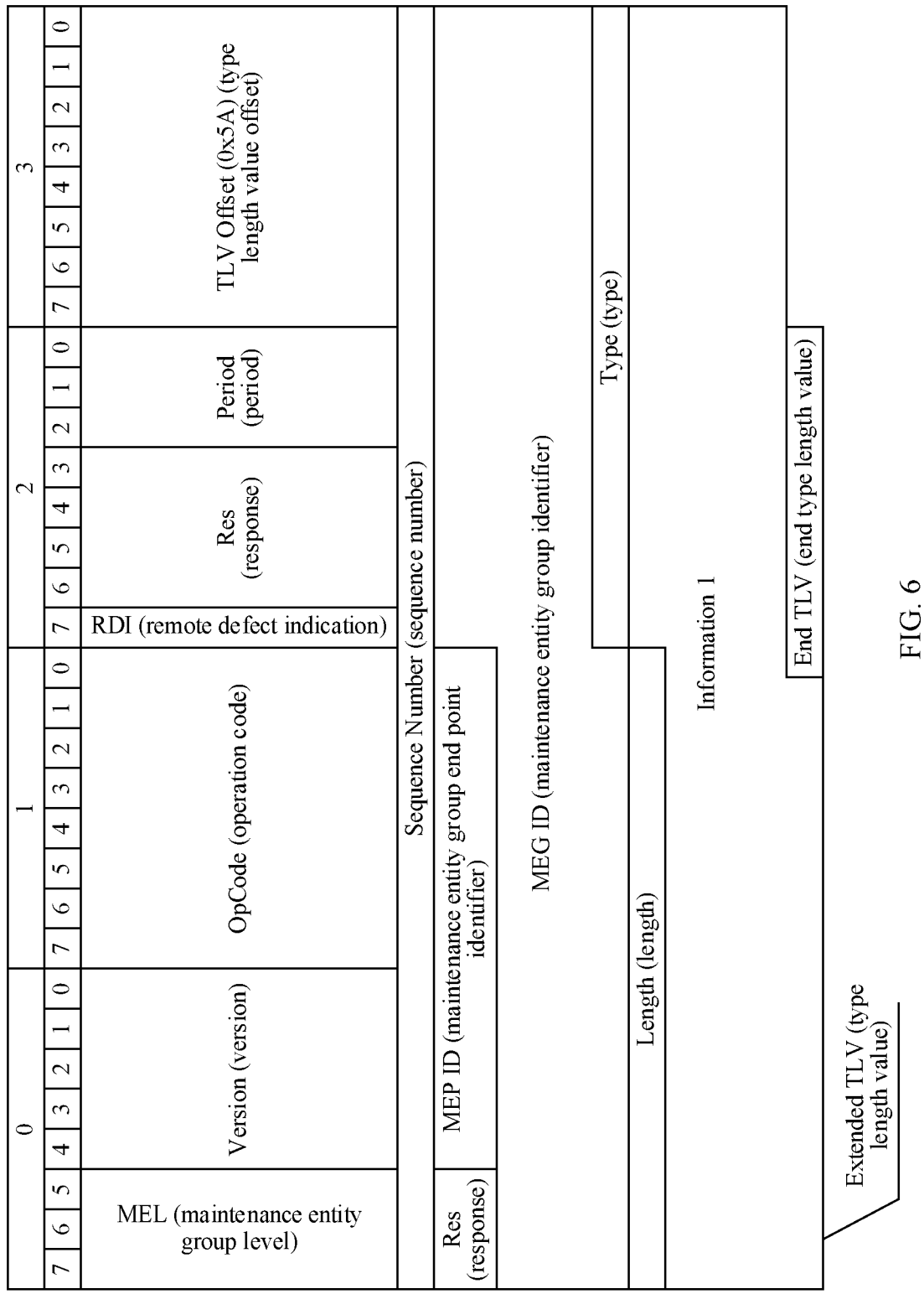
FIG. 6 is a schematic diagram of a payload structure of a continuity check message (CCM) according to an embodiment of this application.

The following uses an example in which the OAM packet is the CCM to describe a manner in which the payload of the OAM packet carries the information 1 with reference to FIG. 6. FIG. 6 is a schematic diagram of a payload structure of a CCM. As shown in FIG. 6, the payload of the CCM includes a MEP ID and a MEG ID corresponding to a first SR-TE tunnel. The payload further includes an extended TLV, and the extended TLV includes information 1. The information 1 includes that a tunnel identifier of the first SR-TE tunnel is an LSP ID1, and may further include that a head node identifier of the first SR-TE tunnel is an LSR ID1.

The payload of the CCM may further include another field, for example, may further include a maintenance entity group level (MEL), a version, an operation code (OpCode), a remote defect indication (RDI), a response (Res), a period, a TLV offset, a sequence number, and an end TLV.

When an OAM packet is a delay detection packet, the OAM packet further includes a sending time at which a head node sends an OAM detection packet 1.

Figure 7:
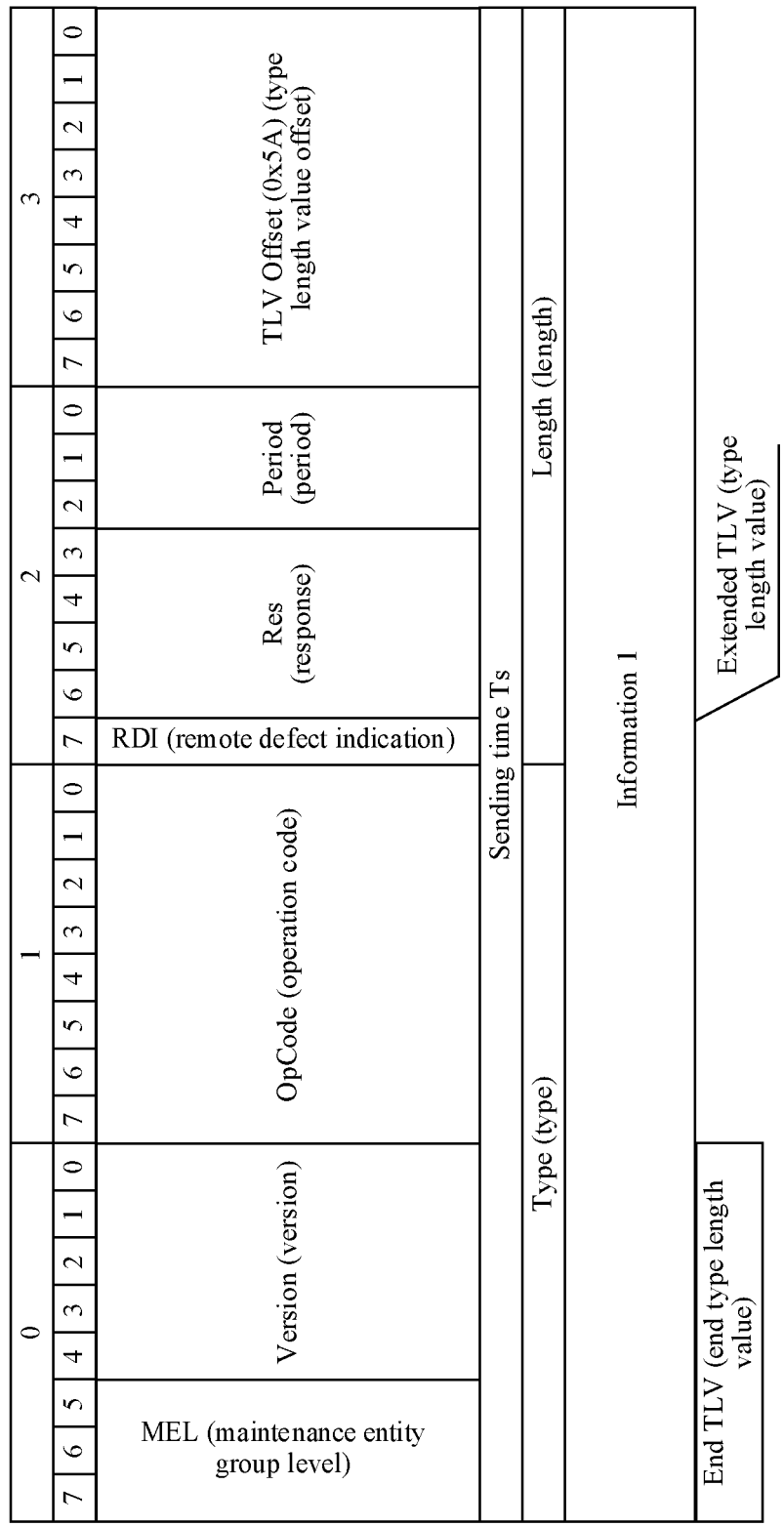
FIG. 7 is a schematic diagram of a payload structure of a delay detection packet according to an embodiment of this application.

FIG. 7 is a schematic diagram of a payload structure of a possible delay detection packet. As shown in FIG. 7, the payload of the delay detection packet includes a sending time Ts1 at which a head node sends a first packet and information 1. The information 1 includes that a tunnel identifier of a first SR-TE tunnel is an LSP ID1, and may further include that a head node identifier of the first SR-TE tunnel is an LSR ID1, and/or the information 1 includes the foregoing MEP ID and MEG ID.

The payload of the delay detection packet may further include another field, for example, may further include MEL, Version, OpCode, RDI, Res, Period, TLV Offset, End TLV, and the like.

In an implementation, the delay detection packet is a one-way delay detection packet, a two-way delay detection packet, or the like.

In an implementation, when the head node performs OAM detection on a second SR-TE tunnel, the head node first sends an OAM detection packet including a CCM, to detect whether the second SR-TE tunnel is normally connected. When the second SR-TE tunnel is normally connected, the head node continues to send an OAM detection packet including the delay detection packet, to detect a transmission delay of the second SR-TE tunnel.

In an implementation, the head node receives indication information 2, where the indication information 2 indicates whether the second SR-TE tunnel is normally connected. When the indication information 2 indicates that the second SR-TE tunnel is normally connected, the OAM detection packet including the delay detection packet is sent.

The indication information 2 may be sent by an intermediate node 1, or may be sent by a control management device.

When detecting that the second SR-TE tunnel is normally connected, the intermediate node 1 sends the indication information 2 to the head node. Alternatively, after detecting that the second SR-TE tunnel is normally connected, the intermediate node 1 notifies the control management device that the second SR-TE tunnel is normally connected, and the control management device sends the indication information 2 to the head node.

In an implementation, when the first SR-TE tunnel is a two-way tunnel, the intermediate node 1 sends the indication information 2 to the head node through the second SR-TE tunnel.

Figure 8:
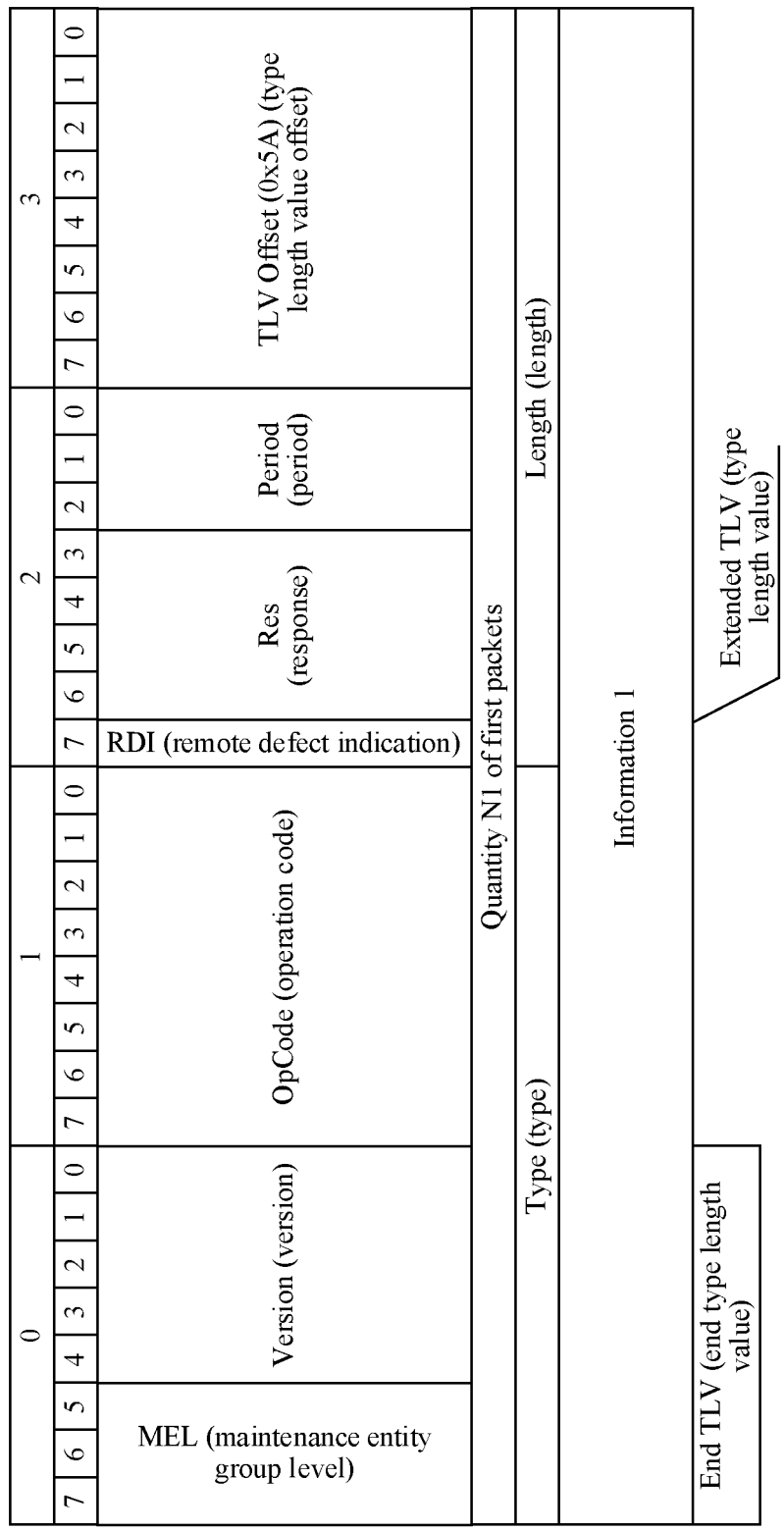
FIG. 8 is a schematic diagram of a payload structure of a packet loss detection packet according to an embodiment of this application.

FIG. 8 is a schematic diagram of a payload structure of a packet loss detection packet. As shown in FIG. 8, the payload of the packet loss detection packet includes a quantity N1 of OAM detection packets 1 and information 1. The information 1 includes that a tunnel identifier of a first SR-TE tunnel is an LSP ID1, and may further include that a head node identifier of the first SR-TE tunnel is an LSR ID1, and/or the information 1 may include the foregoing MEP ID and MEG ID.

The payload of the packet loss detection packet may further include another field, for example, may further include MEL, Version, OpCode, RDI, Res, Period, TLV Offset, End TLV, and the like.

In an implementation, similar to delay detection described above, a head node performs packet loss detection only when a second SR-TE tunnel is normally connected. For how to determine whether the second SR-TE tunnel is normally connected, refer to the foregoing related descriptions. Details are not described herein again.

For an extended TLV field in the foregoing OAM packet of any type, the extended TLV field includes three fields: a type, a length, and a value, and the value field may include information 1.

In an implementation, a period interval at which the head node performs OAM detection on the second SR-TE tunnel may be N times a period interval at which the head node performs OAM detection on the first SR-TE tunnel. When N is greater than 1, a frequency of obtaining OAM information of the second SR-TE tunnel may be reduced, to reduce pressure on a node of the second SR-TE tunnel. In an implementation, N may be equal to a value such as 3, 4, 6, or 10.

In this application, there is at least one intermediate node between the head node and the intermediate node 1, or there is no intermediate node between the head node and the intermediate node 1.

When there is further at least one intermediate node between the head node and the intermediate node 1, any intermediate node in the at least one intermediate node performs the following operation in S303.

When there is no intermediate node between the head node and the intermediate node 1, if a downstream node of the head node is the intermediate node 1, the following S304 is directly performed.

S303: An intermediate node 2 obtains an OAM detection packet 2, and sends the OAM detection packet 2 to a downstream node of the intermediate node 2.

If the OAM detection packet 1 is the MPLS packet, the intermediate node 2 or a previous hop of node of the intermediate node 2 (if any) pops up a stack top label of an OAM detection packet 1, to obtain the OAM detection packet 2.

If the OAM detection packet 1 is the SRv6 packet, the intermediate node 2 decreases an SL value in the OAM detection packet 1 by 1, to obtain the OAM detection packet 2, reads a label from the SRH based on the decreased SL value, and sends the OAM detection packet 2 to the downstream node.

S304: The intermediate node 1 obtains an OAM detection packet 3, and obtains the OAM packet based on the OAM detection packet 3.

If the OAM detection packet is the MPLS packet, when the intermediate node 1 is directly connected to an upstream node, and the intermediate node 1 pops up the stack top label, the OAM detection packet 3 obtained by the intermediate node 1 is a packet sent by the upstream node. If the intermediate node 1 is not directly connected to the upstream node, a label stack of the OAM detection packet 3 may be the same as or different from a label stack of an OAM detection packet sent by the upstream node.

If the OAM detection packet is an SRV6 packet, the OAM detection packet 3 and the OAM detection packet sent by the upstream node may be same packets.

In an implementation, the OAM detection packet 3 obtained by the intermediate node 1 may include a stack bottom label and the OAM packet; and the stack bottom label is popped up to obtain the OAM packet.

S305: The intermediate node 1 obtains OAM information 1 based on the OAM packet, where the OAM information 1 is the OAM information corresponding to the second SR-TE tunnel.

The OAM information 1 includes indication information for identifying whether the second SR-TE tunnel is normally connected, a first transmission delay, jitter, and a bit error rate of the second SR-TE tunnel, and/or a first packet loss rate of the second SR-TE tunnel.

The intermediate node 1 may determine, based on the OAM information 1, tunnel performance related to the second SR-TE tunnel, for example, whether the tunnel is faulty, a transmission delay, a packet loss rate, a bit error rate, and jitter of the tunnel.

In an implementation, when determining that tunnel-related performance does not meet a preset requirement, the intermediate node 1 may send an alarm.

In the foregoing solution, because the intermediate node 1 obtains the OAM packet, the OAM information 1 of the second SR-TE tunnel between the head node and the intermediate node 1 is obtained based on the OAM packet. In this way, the intermediate node 1 can implement refined management on the first SR-TE tunnel based on the OAM information 1. For example, the intermediate node 1 may collect statistics on performance of the second SR-TE tunnel based on the OAM information 1, and notify a control management device of a corresponding statistical result. Alternatively, the intermediate node 1 may directly report the OAM information 1 to the control management device, so that the control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

In an implementation, the intermediate node 1 may send related OAM information to the control management device, and the control management device further manages the tunnel.

With reference to S306 and S307, the following describes a method process in which the control management device manages the tunnel based on the OAM information reported by the intermediate node.

S306: The intermediate node 1 sends the OAM information 1 to the control management device.

The OAM information 1 may include one or more of the following information: information 1 (for example, including an LSP ID1 and an LSR ID1); and first connection indication information of the second SR-TE tunnel, a first transmission delay Δt1, and/or a first packet loss rate L1.

For another intermediate node of the first SR-TE tunnel, the head node may also obtain an OAM detection packet that includes a stack bottom label pointing to the another intermediate node, and send the OAM detection packet to the another intermediate node. Therefore, the another intermediate node can also obtain a corresponding OAM packet, obtain OAM information of a third SR-TE tunnel between the head node and the another intermediate node based on the OAM packet, where the third SR-TE tunnel is a part of the first SR-TE tunnel, and send the OAM information to the control management device.

In an implementation, for the second SR-TE tunnel, if the second SR-TE tunnel is already faulty when the head node sends the OAM detection packet 1 for a first time, the intermediate node 1 cannot receive the OAM detection packet 3. In this way, the intermediate node 1 cannot receive an OAM packet 3, cannot obtain the OAM information of the second SR-TE tunnel, and does not actively send the OAM information to the control management device. The control management device sends a query command to the intermediate node 1 when duration in which the OAM information sent by the intermediate node 1 is not received exceeds a time threshold. The intermediate node 1 receives the query command, detects that the intermediate node 1 does not receive the OAM detection packet 3, and sends OAM information 1 of the second SR-TE tunnel to the control management device. The OAM information 1 includes connection indication information and/or a packet loss rate of the second SR-TE tunnel. The connection indication information is used to identify that the second SR-TE tunnel is not normally connected, and the packet loss rate is 100%.

It should be noted that, when the first SR-TE tunnel is the two-way tunnel, a tail node of the first SR-TE tunnel may also obtain an OAM detection packet, where a stack bottom label of a label stack in the OAM detection packet points to an intermediate node of the first SR-TE tunnel, and sends the OAM detection packet to the intermediate node, so that the intermediate node obtains OAM information of an SR-TE tunnel between the tail node and the intermediate node, and sends the OAM information to the control management device. For detailed implementation processes of the tail node and the intermediate node, refer to content of S301 to S305. Details are not described herein again.

In an implementation, the tail node of the first SR-TE tunnel may also obtain OAM information of the first SR-TE tunnel, and send the OAM information to the control management device, so that the control management device may manage a tunnel between any intermediate node and the tail node of the first SR-TE tunnel.

S307: The control management device receives the OAM information 1 sent by the intermediate node 1, and manages the first SR-TE tunnel based on the OAM information 1.

In an implementation, the control management device may determine tunnel performance of the second SR-TE tunnel based on the OAM information 1. In this way, refined management may be performed on the first SR-TE tunnel. For example, when it is determined that the tunnel performance of the second SR-TE tunnel does not meet a requirement, traffic optimization is performed, to reselect the forwarding path corresponding to the second SR-TE tunnel.

In an implementation, when an SR-TE tunnel includes a plurality of intermediate nodes, the control management device may further receive OAM information sent by another intermediate node. For example, the control management device receives OAM information 2 sent by the intermediate node 2. The OAM information 2 is OAM information of a third SR-TE tunnel between the head node and the intermediate node 2, and the third SR-TE tunnel is a part of the first SR-TE tunnel. The OAM information 2 may include one or more of the following information: information 1, second connection indication information of the third SR-TE tunnel, a second transmission delay $\Delta t2$, and/or a first packet loss rate L2.

The following lists several examples in which the control management device manages the first SR-TE tunnel.

In a first example, the control management device obtains OAM information 3 of a fourth SR-TE tunnel between the intermediate node 2 and the intermediate node 1 based on the OAM information 1 and the OAM information 2. The fourth SR-TE tunnel is a part of the first SR-TE tunnel.

In the first example, the control management device selects the OAM information 1 and the OAM information 2 including the information 1 from received OAM information, and obtains the OAM information 3 based on the OAM information 1 and the OAM information 2.

The OAM information 3 includes: third connection indication information of the fourth SR-TE tunnel, a third transmission delay, and/or a third packet loss rate.

In an implementation, the control management device determines tunnel performance related to the fourth SR-TE tunnel based on the OAM information 3, for example, whether the tunnel is faulty or whether the tunnel is congested.

In an implementation, when the OAM information 1 includes the first connection indication information of the second SR-TE tunnel and the OAM information 2 includes the second connection indication information of the third SR-TE tunnel, when the first connection indication information is used to identify that the second SR-TE tunnel is not normally connected and the second connection indication information is used to identify that the third SR-TE tunnel is normally connected, the third connection indication information of the fourth SR-TE tunnel is obtained to identify that the fourth SR-TE tunnel is not normally connected. When the first connection indication information is used to identify that the second SR-TE tunnel is normally connected and the second connection indication information is used to identify that the third SR-TE tunnel is normally connected, the third connection indication information of the fourth SR-TE tunnel is obtained to identify that the fourth SR-TE tunnel is normally connected.

In an implementation, when the third connection indication information identifies that the fourth SR-TE tunnel is not normally connected, the control management device may determine that the fourth SR-TE tunnel is faulty.

In an implementation, when the OAM information 1 includes the first transmission delay $\Delta t1$ of the second SR-TE tunnel and the OAM information 2 includes the second transmission delay $\Delta t2$ of the third SR-TE tunnel, a third transmission delay $\Delta t3$ of the fourth SR-TE tunnel between the intermediate node 2 and the intermediate node 1 is obtained, where $\Delta t3 = \Delta t1 - \Delta t1$.

In an implementation, when the OAM information 1 includes the first packet loss rate L1 of the second SR-TE tunnel and the OAM information 3 includes the second packet loss rate L2 of the third SR-TE tunnel, a third packet loss rate L3 of the fourth SR-TE tunnel between the intermediate node 2 and the intermediate node 1 is obtained, where $L3 = L1 - L2$.

In an implementation, when the third connection indication information identifies that the fourth SR-TE tunnel is normally connected, but the third transmission delay exceeds a delay threshold and/or the third packet loss rate exceeds a packet loss rate threshold, the control management device may determine that the fourth SR-TE tunnel is congested.

In a second example, the control management device recalculates, based on the OAM information 1, a forwarding path corresponding to the first SR-TE tunnel.

The control management device collects statistics on performance of the second SR-TE tunnel based on the OAM information 1. For example, statistics on a delay, a packet loss, and/or a bit error of the second SR-TE tunnel are collected. When the performance of the second SR-TE tunnel does not meet a path transmission requirement, the forwarding path corresponding to the second SR-TE tunnel is re-determined, to re-adjust some forwarding paths of the first SR-TE tunnel. For example, when the delay, the packet loss, or the bit error of the second SR-TE tunnel exceeds a specified threshold, it is determined that the performance of the second SR-TE tunnel does not meet a requirement, and the forwarding path corresponding to the second SR-TE tunnel is re-determined.

In a third example, the control management device obtains OAM information of each tunnel segment of the first SR-TE tunnel, determines a state of each tunnel segment based on the OAM information of each tunnel segment, displays the first SR-TE tunnel, and displays the state of each tunnel segment and/or the OAM information of each tunnel segment on each tunnel segment of the first SR-TE tunnel.

In the third example, the control management device may display the foregoing content to a user, to present visualized management to the user.

In an implementation, the state of the tunnel may be a normal state or a faulty state. The control management device may use different colors to display the state of the tunnel. For example, for a tunnel segment in the normal state, a color may be used to display the tunnel segment. For a tunnel segment in the faulty state, another color may be used to display the tunnel segment.

In addition to the first example, the second example, and the third example for managing the first SR-TE tunnel that are listed above, there may be another example. For example, the control management device may generate an alarm based on the OAM information of each tunnel segment. For example, when a transmission delay of a tunnel segment exceeds the delay threshold or a packet loss rate of a tunnel segment exceeds the packet loss rate threshold, the control management device generates the alarm. Other examples are not listed one by one.

In this embodiment of this application, if OAM information of a tunnel segment from the head node to an intermediate node of the first SR-TE tunnel needs to be obtained, the head node may obtain the OAM detection packet 1. The OAM detection packet 1 includes a label stack and an OAM packet, and a stack bottom label of the label stack points to the intermediate node. In this way, the intermediate node may obtain and identify the OAM packet, obtain OAM information of a second SR-TE tunnel between the head node and the intermediate node based on the OAM packet, and send the OAM information to the control management device. Any intermediate node of the first SR-TE tunnel may send the OAM information to the control management device. In this way, the control management device may obtain OAM information of any tunnel segment of the first SR-TE tunnel based on the OAM information sent by each intermediate node, and manage the any tunnel segment based on the OAM information of the any tunnel segment, to implement refined management on the first SR-TE tunnel, and improve operation and maintenance efficiency. The control management device may further obtain the OAM information of each tunnel segment of the first SR-TE tunnel based on OAM information of each node, perform accurate fault locating and troubleshooting, plan a forwarding path corresponding to the first SR-TE tunnel, and avoid a congested or faulty node and tunnel when planning the forwarding path. The planned forwarding path may avoid congestion and reduce a delay, and the forwarding path is used to transmit a service, to improve service transmission efficiency.

Figure 9:
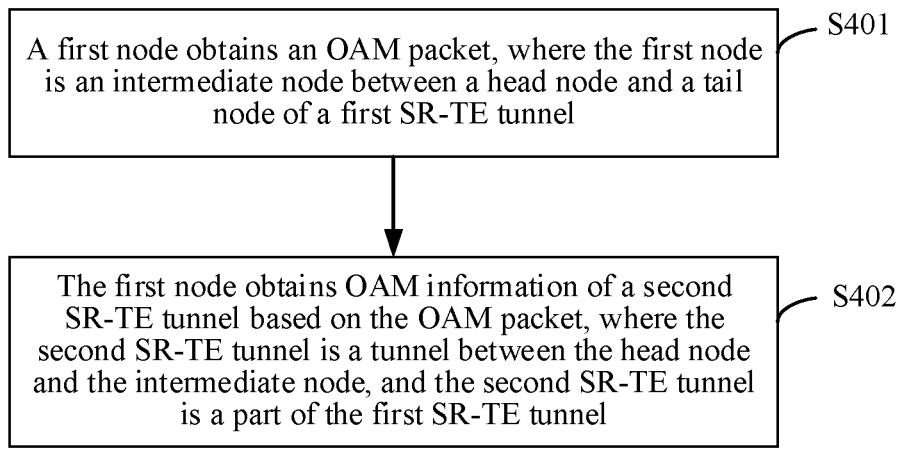
FIG. 9 is a flowchart of another tunnel management method according to an embodiment of this application.

Referring to FIG. 9, an embodiment of this application provides a tunnel management method 400. The method 400 is applied to the network architecture 100 shown in FIG. 1. The method 400 may implement the method 300. The method 400 includes the following steps.

S401: A first node obtains an OAM packet, where the first node is an intermediate node between a head node and a tail node of a first SR-TE tunnel.

When the method 400 is used to implement the method 300, the first node may be the intermediate node 1 in the embodiment shown in FIG. 3. For a detailed process of obtaining the OAM packet by the first node, refer to an operation performed by the intermediate node 1 in S304 in the embodiment shown in FIG. 3. Details are not described herein again.

The OAM packet is an OAM packet included in each OAM detection packet in the foregoing method embodiments.

S402: The first node obtains OAM information of a second SR-TE tunnel based on the OAM packet, where the second SR-TE tunnel is a tunnel between the head node and the intermediate node, and the second SR-TE tunnel is a part of the first SR-TE tunnel.

For a detailed process of obtaining the OAM information by the first node, refer to an operation performed by the intermediate node 1 in S305 in the embodiment shown in FIG. 3. Details are not described herein again.

The OAM information is OAM information obtained by each intermediate node in the foregoing method embodiments.

In an implementation, the first node sends the OAM information to the control management device.

When the method 400 is used to implement the method 300, for a detailed process of sending the OAM information by the first node, refer to an operation performed by the intermediate node 1 in S306 in the embodiment shown in FIG. 3. Details are not described herein again.

In an implementation, the OAM packet includes first information, the first information includes first indication information, and the first indication information indicates the first SR-TE tunnel.

The first information is information 1 included in each OAM packet in the foregoing method embodiments, and the first indication information is indication information 1 included in the information 1 in the foregoing method embodiments.

In an implementation, the first information further includes an identifier of the head node.

When the method 400 is used to implement the method 300, the head node may be the head node in the embodiment shown in FIG. 3.

In an implementation, the first node creates, based on the first information, an OAM maintenance entity group corresponding to the second SR-TE tunnel.

In an implementation, the first indication information includes a maintenance entity group end point identifier MEP ID and a maintenance entity group identifier MEG ID corresponding to the first SR-TE tunnel; or the first indication information includes a tunnel identifier of the first SR-TE tunnel.

The first indication information is indication information 1 included in each OAM packet in the foregoing method embodiments.

In an implementation, the first node receives a first packet, and the first packet includes a stack bottom label and an OAM packet. The first node pops up the stack bottom label and obtains the OAM packet.

When the method 400 is used to implement the method 300, for a detailed process of obtaining the OAM packet by the first node, refer to an operation performed by the intermediate node 1 in S304 in the embodiment shown in FIG. 3. Details are not described herein again.

In this embodiment of this application, according to the foregoing solution, as the intermediate node of the first SR-TE tunnel, the first node can obtain and identify the OAM packet sent by the head node, and the first node obtains the OAM information of the second SR-TE tunnel based on the OAM packet. In this way, the second SR-TE tunnel can be managed based on the OAM information, to implement refined management on the first SR-TE tunnel. For example, the first node may perform fault locating and troubleshooting on the first SR-TE tunnel, so that a management granularity is finer, and refined management is performed on the first SR-TE tunnel, to improve operation and maintenance efficiency. The first node may collect statistics on performance of the second SR-TE tunnel based on the obtained OAM information, and notify a control management device of a corresponding statistical result. Alternatively, the first node may directly report the OAM information to the control management device. The control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

Figure 10:
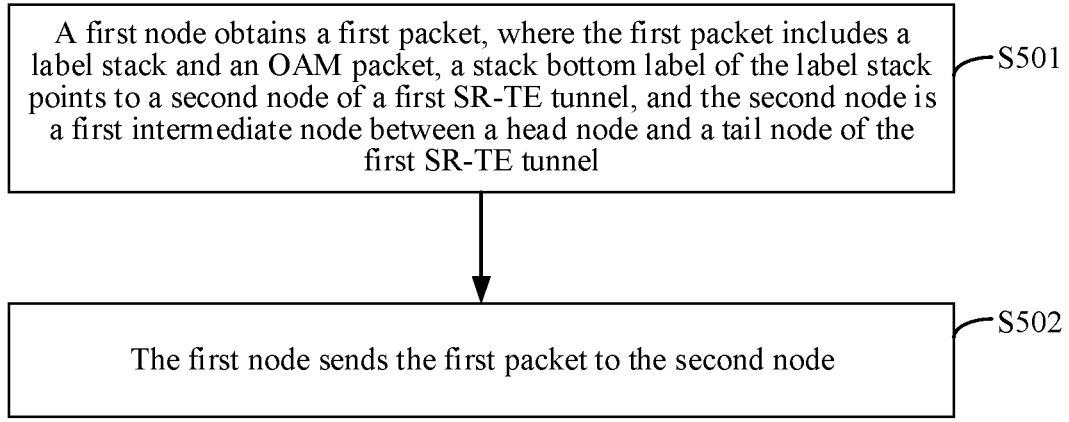
FIG. 10 is a flowchart of another tunnel management method according to an embodiment of this application.

Referring to FIG. 10, an embodiment of this application provides a tunnel management method 500. The method 500 is applied to the network architecture 100 shown in FIG. 1. The method 500 may implement the method 300. The method 500 includes the following steps.

S501: A first node of a first SR-TE tunnel obtains a first packet, where the first packet includes a label stack and an OAM packet, a stack bottom label of the label stack points to a second node of the first SR-TE tunnel, and the second node is a first intermediate node between a head node and a tail node of the first SR-TE tunnel.

When the method 500 is used to implement the method 300, the first node may be the head node or the intermediate node 2 in the embodiment shown in FIG. 3. When the first node is the head node, for a detailed process of obtaining the first packet by the first node, refer to an operation performed by the head node in S301 in the embodiment shown in FIG. 3. Details are not described herein again.

When the first node is the intermediate node 2, for a detailed process of obtaining the first packet by the first node, refer to an operation performed by the intermediate node 2 in S303 in the embodiment shown in FIG. 3. Details are not described herein again.

The first packet is the OAM detection packet 1 in the foregoing method embodiments.

The OAM packet is an OAM packet included in each OAM detection packet in the foregoing method embodiments.

S502: The first node sends the first packet to the second node.

When the first node is the head node, for a detailed process of sending the first packet by the first node, refer to an operation performed by the head node in S302 in the embodiment shown in FIG. 3. Details are not described herein again.

When the first node is the intermediate node 2, for a detailed process of sending the first packet by the first node, refer to an operation performed by the intermediate node 2 in S303 in the embodiment shown in FIG. 3. Details are not described herein again.

When the method 500 is used to implement the method 300, the first node may be the intermediate node 1 in the embodiment shown in FIG. 3.

In an implementation, the OAM packet includes first indication information, and the first indication information indicates the first SR-TE tunnel.

The first indication information is indication information 1 included in each OAM packet in the foregoing method embodiments.

In an implementation, the OAM packet further includes an identifier of the head node.

When the method 500 is used to implement the method 300, the head node may be the head node in the embodiment shown in FIG. 3.

In an implementation, the first indication information includes a maintenance entity group end point identifier MEP ID and a maintenance entity group identifier MEG ID corresponding to the first SR-TE tunnel; or the first indication information includes a tunnel identifier of the first SR-TE tunnel.

In an implementation, the first node is a second intermediate node between the head node and the tail node of the first SR-TE tunnel.

When the method 500 is used to implement the method 300, the first node may be the intermediate node 2 in the embodiment shown in FIG. 3.

In an implementation, the first node is the head node of the first SR-TE tunnel.

When the method 500 is used to implement the method 300, the first node may be the head node in the embodiment shown in FIG. 3.

In an implementation, the OAM packet is a delay detection packet or a packet loss detection packet. In response to determining that the second SR-TE tunnel between the first node and the second node is normally connected, the first packet is sent to the second node, and the second SR-TE tunnel is a part of the first SR-TE tunnel.

For a detailed process of sending the first packet by the first node, refer to an operation of sending the OAM detection packet 1 by the head node in S302 in the embodiment shown in FIG. 3. Details are not described herein again.

In an implementation, the first node receives second indication information, where the second indication information indicates that the second SR-TE tunnel is normally connected.

The second indication information is indication information 2 included in each OAM packet in the foregoing method embodiments.

In this embodiment of this application, because the stack bottom label of the label stack of the first packet obtained by the first node points to the second node of the first SR-TE tunnel, when the first packet is transmitted to the second node, the second node can obtain and identify the OAM packet included in the first packet. As an intermediate node of the first SR-TE tunnel, the second node obtains OAM information of a second SR-TE tunnel based on the OAM packet. The second SR-TE tunnel is a tunnel between the head node and the second node, and is a part of the first SR-TE tunnel. In this way, the second node can implement refined management on the first SR-TE tunnel based on the OAM information. For example, the second node may collect statistics on performance of the second SR-TE tunnel based on the obtained OAM information, and notify a control management device of a corresponding statistical result. Alternatively, the second node may directly report the OAM information to the control management device. The control management device may collect statistics on performance of each tunnel based on OAM information reported by one or more intermediate nodes, and perform more refined management on the tunnel based on a statistical result. Collection of the statistics on the performance of the tunnel includes but is not limited to calculation of a delay, a packet loss rate, or a bit error rate of the tunnel. For example, when a forwarding path corresponding to the second SR-TE tunnel does not meet a path transmission requirement (for example, when performance such as a delay, a packet loss, or a bit error does not meet a requirement), the forwarding path corresponding to the second SR-TE tunnel may be re-determined, to re-adjust some forwarding paths of the first SR-TE tunnel. Compared with an entire end-to-end SR-TE tunnel, this method may implement more accurate fault locating and finer management granularity, to greatly improve operation and maintenance efficiency, and service transmission quality and transmission efficiency.

Figure 11:
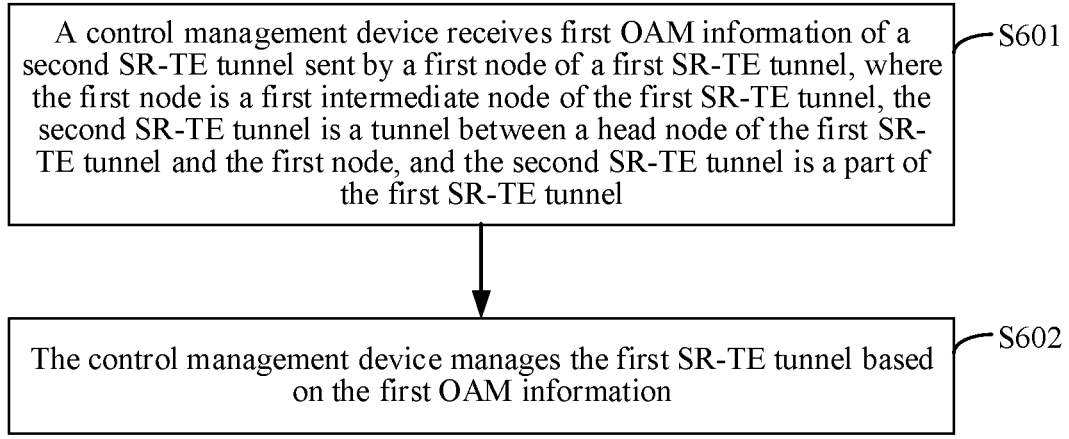
FIG. 11 is a flowchart of another tunnel management method according to an embodiment of this application.

Referring to FIG. 11, an embodiment of this application provides a tunnel management method 600. The method 600 is applied to the network architecture 100 shown in FIG. 1. The method 600 may implement the method 300. The method 600 includes the following steps.

S601: A control management device receives first OAM information of a second SR-TE tunnel sent by a first node of a first SR-TE tunnel, where the first node is a first intermediate node of the first SR-TE tunnel, the second SR-TE tunnel is a tunnel between a head node of the first SR-TE tunnel and the first node, and the second SR-TE tunnel is a part of the first SR-TE tunnel.

When the method 600 is used to implement the method 300, the first node may be the intermediate node 1 in the embodiment shown in FIG. 3.

The first OAM information is the OAM information 1 in the foregoing method embodiments.

S602: The control management device manages the first SR-TE tunnel based on the first OAM information.

When the method 600 is used to implement the method 300, for a detailed process of managing the first SR-TE tunnel by the control management device, refer to content in S307 in the embodiment shown in FIG. 3. Details are not described herein again.

In an implementation, the control management device receives second OAM information that is sent by a second node and that corresponds to a third SR-TE tunnel. The second node is a second intermediate node of the first SR-TE tunnel, the third SR-TE tunnel is a tunnel between the head node of the first SR-TE tunnel and the second node, and the third SR-TE tunnel is a part of the first SR-TE tunnel.

The control management device obtains third OAM information of a fourth SR-TE tunnel between the first node and the second node based on the first OAM information and the second OAM information. The fourth SR-TE tunnel is a part of the first SR-TE tunnel.

For a detailed process of obtaining the third OAM information by the control management device, refer to content in S307 in the embodiment shown in FIG. 3. Details are not described herein again.

The second OAM information is the OAM information 2 in the foregoing method embodiments, and the third OAM information is the OAM information 3 in the foregoing method embodiments.

When the method 600 is used to implement the method 300, the second node may be the intermediate node 2 in the embodiment shown in FIG. 3.

In an implementation, the control management device recalculates a forwarding path of the first SR-TE tunnel based on the first OAM information.

For a detailed process of recalculating the forwarding path by the control management device, refer to content in S307 in the embodiment shown in FIG. 3. Details are not described herein again.

In an implementation, the control management device sends second indication information to the head node. The second indication information indicates that the second SR-TE tunnel is normally connected.

The second indication information is indication information 2 included in each OAM packet in the foregoing method embodiments.

In this embodiment of this application, as an intermediate node of the first SR-TE tunnel, the first node may directly send the first OAM information to the control management device. The control management device collects statistics on performance of each tunnel based on OAM information reported by one or more intermediate nodes, and performs refined management on the first SR-TE tunnel based on a statistical result, to improve operation and maintenance efficiency. The control management device may further obtain the OAM information of each tunnel segment of the first SR-TE tunnel based on OAM information of each node, perform accurate fault locating and troubleshooting, plan a forwarding path corresponding to the first SR-TE tunnel, and avoid a congested or faulty node and tunnel when planning the forwarding path. The planned forwarding path may avoid congestion and reduce a delay, and the forwarding path is used to transmit a service, to improve service transmission efficiency.

Figure 12:
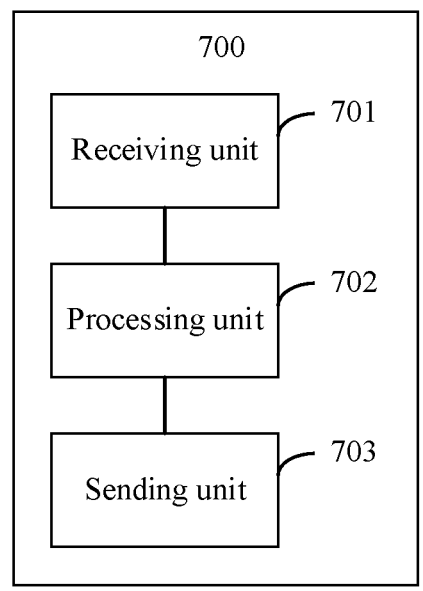
FIG. 12 is a schematic diagram of a structure of a tunnel management apparatus according to an embodiment of this application.

Referring to FIG. 12, an embodiment of this application provides a tunnel management apparatus 700. The apparatus 700 is arranged on the head node, the intermediate node 1, the intermediate node 2, or the control management device provided in the embodiments shown in FIG. 1, FIG. 3, FIG. 9, FIG. 10, or FIG. 11, and includes a receiving unit 701, a processing unit 702, and a sending unit 703.

In an implementation, the apparatus 700 is configured to implement operations performed by the intermediate nodes in the foregoing method embodiments. The receiving unit 701 is configured to implement a receiving operation performed by the intermediate node, the sending unit 703 is configured to implement a sending operation performed by the intermediate node, and the processing unit 702 is configured to implement an operation other than receiving and sending performed by the intermediate node. For example, when the apparatus 700 is configured to perform the method performed by the intermediate node 1 in the method 300, the receiving unit 701 may be configured to receive an OAM detection packet sent by a head node, and the processing unit 702 is configured to obtain an OAM packet carried in the OAM detection packet, and obtain OAM information based on the OAM packet. The sending unit 703 may be configured to send the obtained OAM information to a control management device. For example, when the apparatus 700 is configured to perform the method performed by the intermediate node 2 in the method 300, the receiving unit 701 may be configured to receive an OAM detection packet 1 of the head node, the processing unit 702 may be configured to obtain an OAM detection packet 2 based on the OAM detection packet 1, and the sending unit 703 is configured to send the OAM detection packet 2.

In an implementation, the apparatus 700 is configured to implement operations performed by the head nodes in the foregoing method embodiments. The receiving unit 701 is configured to implement a receiving operation performed by the head node, the sending unit 703 is configured to implement a sending operation performed by the head node, and the processing unit 702 is configured to implement an operation other than receiving and sending performed by the head node. For example, the receiving unit 701 is configured to receive indication information 2 sent by the control management device, the processing unit 702 is configured to obtain the OAM detection packet 1, and the sending unit 703 is configured to send the OAM detection packet 1.

In an implementation, the apparatus 700 is configured to implement operations performed by the control management devices in the foregoing method embodiments. The receiving unit 701 is configured to implement a receiving operation performed by the control management device, the sending unit 703 is configured to implement a sending operation performed by the control management device, and the processing unit 702 is configured to implement an operation other than receiving and sending performed by the control management device. For example, the receiving unit 701 is configured to receive OAM information sent by one or more intermediate nodes of a first ST-TE tunnel. The processing unit 702 is configured to manage an SR-TE tunnel based on the received OAM information. For example, OAM information of any tunnel segment of the first SR-TE tunnel is obtained based on the received OAM information, or a forwarding path corresponding to the first SR-TE tunnel is recalculated based on the received OAM information. The sending unit 703 is configured to send the indication information 2 to a head node of the first SR-TE tunnel.

Figure 13:
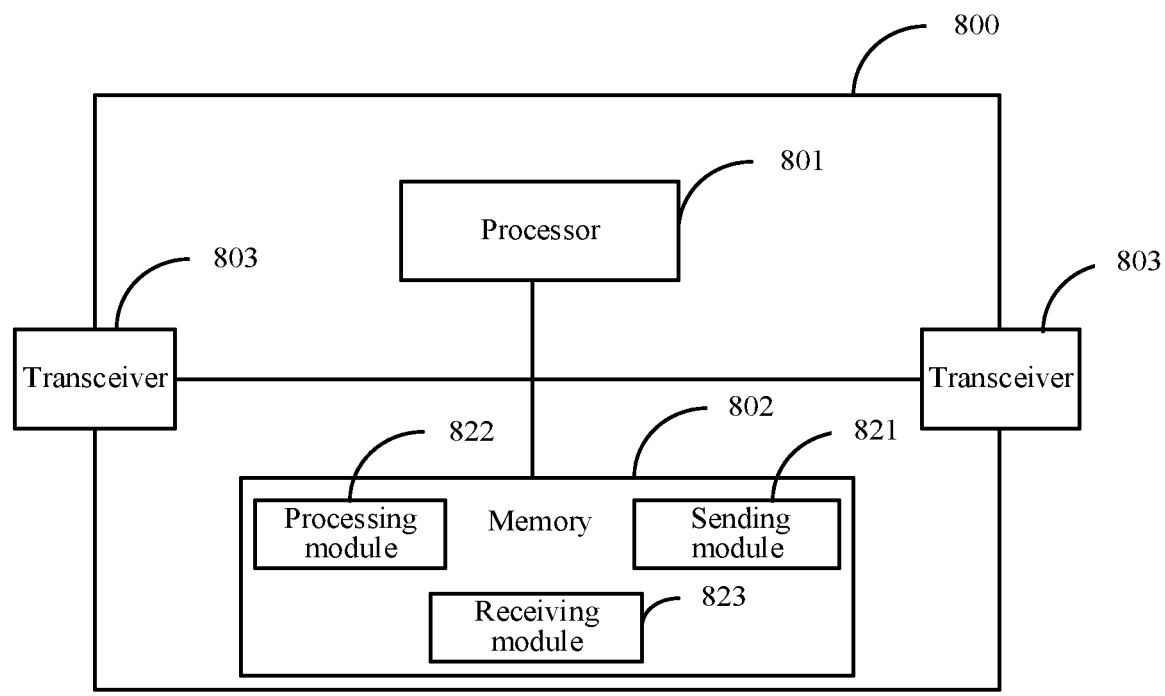
FIG. 13 is a schematic diagram of a structure of another tunnel management apparatus according to an embodiment of this application.

Referring to FIG. 13, an embodiment of this application provides a schematic diagram of a tunnel management apparatus 800. The apparatus 800 may be the head node, the intermediate node 1, the intermediate node 2, or the control management device provided in the embodiments shown in FIG. 1, FIG. 3, FIG. 9, FIG. 10, or FIG. 11, and includes a processor 801, a memory 802, and a transceiver 803. For example, the transceiver 803 may be a communication interface, an optical module, or the like. The processor 801 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor 801 may be one processor, or may include a plurality of processors. The memory 802 may include a volatile memory such as a random-access memory (RAM). Alternatively, the memory may include a non-volatile memory such as a read-only memory (ROM), a flash memory, a hard disk drive (HDD), or a solid-state drive (SSD). Alternatively, the memory 802 may include a combination of the foregoing types of memories. The memory 802 may be one memory, or may include a plurality of memories. In an implementation, the memory 802 stores computer-readable instructions. The computer-readable instructions include a plurality of software modules, for example, a sending module 821, a processing module 822, and a receiving module 823. After executing each software module, the processor 801 may perform a corresponding operation based on indication of each software module. In this embodiment, an operation performed by a software module actually refers to an operation performed by the processor 801 based on indication of the software module.

In an implementation, the memory 802 stores a computer program. The processor 801 is configured to execute a program in the memory 802 and cooperate with the transceiver 803, so that the apparatus 800 is configured to implement operations performed by the intermediate nodes in the foregoing method embodiments. The transceiver 803 is configured to implement a receiving operation or a sending operation performed by an intermediate node, and the processor 801 is configured to implement an operation other than receiving and sending performed by the intermediate node. For example, when the apparatus 800 is configured to perform the method performed by the intermediate node 1 in the method 300, the transceiver 803 may be configured to receive an OAM detection packet sent by a head node, and the processor 801 is configured to obtain an OAM packet carried in the OAM detection packet, and obtain OAM information based on the OAM packet. The transceiver 803 may be further configured to send the obtained OAM information to a control management device. For example, when the apparatus 800 is configured to perform the method performed by the intermediate node 2 in the method 300, the transceiver 803 may be configured to receive an OAM detection packet 1 of the head node, the processor 801 may be configured to obtain an OAM detection packet 2 based on the OAM detection packet 1, and the transceiver 803 is further configured to send the OAM detection packet 2.

In an implementation, the apparatus 800 is configured to implement operations performed by the head nodes in the foregoing method embodiments. The transceiver 803 is configured to implement a receiving operation or a sending operation performed by a head node, and the processor 801 is configured to implement an operation other than receiving and sending performed by the head node. For example, the transceiver 803 is configured to receive indication information 2 sent by the control management device, the processor 801 is configured to obtain the OAM detection packet 1, and the transceiver 803 is configured to send the OAM detection packet 1.

In an implementation, the apparatus 800 is configured to implement operations performed by the control management devices in the foregoing method embodiments. The transceiver 803 is configured to implement a receiving operation or a sending operation performed by the control management device, and the processor 801 is configured to implement an operation other than receiving and sending performed by the control management device. For example, the transceiver 803 is configured to receive OAM information sent by one or more intermediate nodes of a first ST-TE tunnel. The processor 801 is configured to manage an SR-TE tunnel based on the received OAM information. For example, OAM information of any tunnel segment of the first SR-TE tunnel is obtained based on the received OAM information, or a forwarding path corresponding to the first SR-TE tunnel is recalculated based on the received OAM information. The transceiver 803 is configured to send the indication information 2 to a head node of the first SR-TE tunnel.

Figure 14:
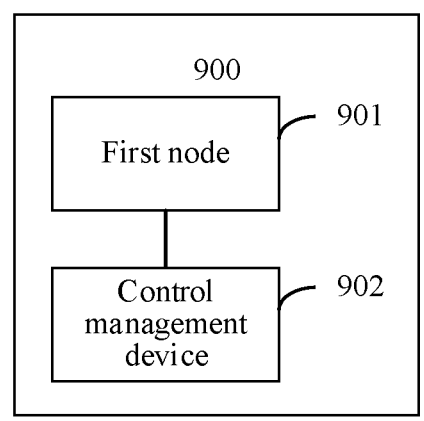
FIG. 14 is a schematic diagram of a structure of a tunnel management communication system according to an embodiment of this application.

Referring to FIG. 14, an embodiment of this application provides a tunnel management communication system 900. The system 900 includes: a first node 901 and a control management device 902.

The first node 901 may be the head node or the intermediate node provided in the embodiment shown in FIG. 1, FIG. 3, FIG. 9, FIG. 10, or FIG. 11. The control management device 902 may be the control management device provided in the embodiment shown in FIG. 1, FIG. 3, FIG. 9, FIG. 10, or FIG. 11.

In an implementation, the first node 901 is configured to implement operations performed by the intermediate nodes in the foregoing method embodiments. For example, when the first node 901 is configured to perform the method performed by the intermediate node 1 in the method 300, the first node 901 may be configured to receive an OAM detection packet sent by a head node, obtain an OAM packet carried in the OAM detection packet, obtain OAM information based on the OAM packet, and send the obtained OAM information to the control management device. For example, when the first node 901 is configured to perform the method performed by the intermediate node 2 in the method 300, the first node 901 receives an OAM detection packet 1 of the head node, obtains an OAM detection packet 2 based on the OAM detection packet 1, and sends the OAM detection packet 2.

In an implementation, the first node 901 is configured to implement operations performed by the head nodes in the foregoing method embodiments. For example, the first node 901 is configured to receive indication information 2 sent by the control management device, obtain the OAM detection packet 1, and send the OAM detection packet 1.

In an implementation, the control management device 902 is configured to implement operations performed by the control management devices in the foregoing method embodiments. For example, the control management device 902 is configured to receive OAM information sent by one or more intermediate nodes of the first ST-TE tunnel, and manage an SR-TE tunnel based on the received OAM information.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

This application further provides a computer program product. The computer program product includes a computer program, and the computer program is used to perform a step of a method in any one of the foregoing embodiments.

A person of ordinary skill in the art may understand that all or a part of steps of the foregoing embodiments may be implemented by hardware, or may be implemented by instructing related hardware through a program, or may be implemented by any combination thereof. The program may be stored in a computer-readable storage medium. The storage medium may be a read-only memory, a magnetic disk, or an optical disc.

The objectives, technical solutions, and beneficial effects of this application are further described in the foregoing implementations. The foregoing descriptions are optional embodiments of this application and are not intended to limit this application. Any modification, equivalent replacement, or improvement made within the principle of this application shall fall within the protection scope of this application.

What is claimed is:

1. A first node, comprising:
a memory configured to store executable instructions; and
at least one processor coupled to the memory and configured to execute the executable instructions to cause the first node to:
obtain an operation, administration, and maintenance (OAM) packet, wherein the first node is an intermediate node between a head node of a first segment routing traffic engineering (SR-TE) tunnel and a tail node of the first SR-TE tunnel; and
obtain OAM information of a second SR-TE tunnel based on the OAM packet,
wherein the second SR-TE tunnel is between the head node and the intermediate node, and
wherein the second SR-TE tunnel is a part of the first SR-TE tunnel.

2. The first node of claim 1, wherein the at least one processor is further configured to execute the executable instructions to cause the first node to send the OAM information to a control management device.

3. The first node of claim 1, wherein the OAM packet comprises first information, and wherein the first information comprises first indication information, that indicates the first SR-TE tunnel.

4. The first node of claim 3, wherein the first information further comprises an identifier of the head node.

5. The first node of claim 3, wherein the at least one processor is further configured to execute the executable instructions to cause the first node to create, based on the first information, an OAM maintenance entity group corresponding to the second SR-TE tunnel.

6. The first node of claim 3, wherein the first indication information comprises a maintenance entity group end point identifier (MEP ID) and a maintenance entity group identifier (MEG ID) corresponding to the first SR-TE tunnel, or the first indication information comprises a tunnel identifier of the first SR-TE tunnel.

7. The first node of claim 1, wherein the at least one processor is further configured to execute the executable instructions to cause the first node to:
receive a first packet, wherein the first packet comprises a stack bottom label and the OAM packet; and
pop up the stack bottom label to obtain the OAM packet.

8. A first node comprising:
a memory, configured to store executable instructions; and
at least one processor coupled to the memory and configured to execute the executable instructions to cause the first node to:
obtain a first packet, wherein the first packet comprises a label stack and an operation, administration, and maintenance (OAM) packet, wherein the first node is a head node of a first segment routing traffic engineering (SR-TE) tunnel, wherein a stack bottom label of the label stack points to a second node of the first SR-TE tunnel, and wherein the second node is a first intermediate node between the head node and a tail node of the first SR-TE tunnel; and
send the first packet to the second node.

9. The first node of claim 8, wherein the OAM packet comprises first indication information that indicates the first SR-TE tunnel.

10. The first node of claim 9, wherein the OAM packet further comprises an identifier of the head node.

11. The first node of claim 9, wherein the first indication information comprises a maintenance entity group end point identifier (MEP ID) and a maintenance entity group identifier (MEG ID) corresponding to the first SR-TE tunnel; or the first indication information comprises a tunnel identifier of the first SR-TE tunnel.

12. The first node of claim 8, wherein the first node is a second intermediate node between the head node and the tail node.

13. The first node of claim 8, wherein the first node is the head node.

14. The first node of claim 13, wherein the OAM packet is a delay detection packet or a packet loss detection packet, and wherein the at least one is further configured to execute the executable instructions to cause the first node to send the first packet to the second node when a second SR-TE tunnel between the first node and the second node is normally connected, and wherein the second SR-TE tunnel is a part of the first SR-TE tunnel.

15. The first node of claim 14, wherein the at least one processor is further configured to execute the executable instructions to cause the first node is to receive second indication information, wherein the second indication information indicates that the second SR-TE tunnel is normally connected.

16. A control management device, comprising:
a memory; configured to store executable instructions; and
at least one processor coupled to the memory and configured to execute the executable instructions to cause the control management device to:
receive first operation, administration, and maintenance (OAM) information that is from a first intermediate node of a first segment routing traffic engineering (SR-TE) tunnel and that corresponds to a second SR-TE tunnel between a head node of the first SR-TE tunnel and the first intermediate node, wherein the second SR-TE tunnel is a part of the first SR-TE tunnel; and
manage the first SR-TE tunnel based on the first OAM information.

17. The control management device of claim 16, wherein the at least one processor is further configured to execute the executable instructions to cause the control management device to:
receive second OAM information that is from a second intermediate node of the first SR-TE tunnel and that corresponds to a third SR-TE tunnel between the head node and the second intermediate node, and wherein the third SR-TE tunnel is part of the first SR-TE tunnel; and
obtain third OAM information of a fourth SR-TE tunnel between the first intermediate node and the second intermediate node based on the first OAM information and the second OAM information, wherein the fourth SR-TE tunnel is a part of the first SR-TE tunnel.

18. The control management device of claim 16, wherein the at least one processor is further configured to execute the executable instructions to cause the control management device to: recalculate a forwarding path of the first SR-TE tunnel based on the first OAM information.

19. The control management device of claim 16, wherein the at least one processor is further configured to execute the executable instructions to cause the control management device to: send second indication information to the head node, and wherein the second indication information indicates that the second SR-TE tunnel is normally connected.

20. The control management device of claim 16, wherein the OAM information comprises an identifier of the head node.

* * * * *

UNITED STATES PATENT AND TRADEMARK OFFICE
CERTIFICATE OF CORRECTION

PATENT NO. : 12,335,150 B2  
APPLICATION NO. : 18/328236  
DATED : June 17, 2025  
INVENTOR(S) : Lihong Hong, Jian Ye and Zhiguo Chen Page 1 of 1

It is certified that error appears in the above-identified patent and that said Letters Patent is hereby corrected as shown below:

In the Claims

Claim 11, Column 27, Line 25: "tunnel; or" should read "tunnel or"

Claim 14, Column 27, Line 35: "at least one is further" should read "at least one processor is further"

Claim 18, Column 28, Line 35: "to: recalculate" should read "to recalculate"

Claim 19, Column 28, Line 40: "to: send" should read "to send"

Signed and Sealed this  
Twenty-ninth Day of July, 2025

Coke Morgan Stewart  
*Acting Director of the United States Patent and Trademark Office*